United States Patent

Sato

[11] Patent Number: 5,590,110
[45] Date of Patent: Dec. 31, 1996

[54] SUPER-RESOLUTION OPTICAL HEAD USING OPTICAL SEPARATOR

[75] Inventor: Masahiko Sato, Tokyo, Japan

[73] Assignee: NEC Corporation, Tokyo, Japan

[21] Appl. No.: 363,939

[22] Filed: Dec. 27, 1994

[30] Foreign Application Priority Data

Dec. 28, 1993 [JP] Japan .................... 5-334561

[51] Int. Cl.⁶ .................................... G11B 7/00
[52] U.S. Cl. .................. 369/100; 369/44.24; 369/112; 369/117
[58] Field of Search ............. 369/44.24, 44.23, 369/44.14, 100, 112, 120, 117, 116, 124; 372/32, 103

[56] References Cited

U.S. PATENT DOCUMENTS

| | | | |
|---|---|---|---|
| 5,121,378 | 6/1992 | Hirose et al. | 369/112 |
| 5,172,366 | 12/1992 | Chikuma | 369/120 |
| 5,206,852 | 4/1993 | Kim et al. | 369/112 |
| 5,349,592 | 9/1994 | Ando | 372/32 |
| 5,434,840 | 7/1995 | Ezuka et al. | 369/100 |
| 5,450,376 | 9/1995 | Matsumura et al. | 369/44.14 |

FOREIGN PATENT DOCUMENTS

| | | |
|---|---|---|
| 1-315040 | 12/1989 | Japan . |
| 1-315041 | 12/1989 | Japan . |
| 2-12623 | 1/1990 | Japan . |
| 2-12624 | 1/1990 | Japan . |
| 2-206035 | 8/1990 | Japan . |
| 2-206036 | 8/1990 | Japan . |

*Primary Examiner*—Nabil Hindi
*Assistant Examiner*—Kim-Kwok Chu
*Attorney, Agent, or Firm*—Sughrue, Mion, Zinn, Macpeak & Seas

[57] ABSTRACT

A super-resolution optical head device in which a first super-resolution spot having a diameter smaller than that of a diffraction limit is formed on a recording medium by modulating beams emitted from a laser light source includes an optical system, an optical separator and a plurality of optical detectors. By the optical system, the laser beams reflected from the recording medium are converged and a second super-resolution spot is reimaged. The optical separator is constituted by a reflection-type pinhole, a diffraction-type pinhole, a refraction-type pinhole, a reflection-and-absorption type pinhole, or a set of a reflection-type pinhole and a reversed-type pinhole, which is placed at the reimaged position and optically separates the second super-resolution spot into a main beam component and a sidelobe component. The optical separator leads to the optical detectors the main beam component and the sidelobe component independently from each other. The device enables to easily obtain reproduction signals with little deterioration caused by the sidelobe component.

7 Claims, 7 Drawing Sheets

ON MEDIUM (SHIELDING REGION)  PINHOLE APERTURE  (SHIELDING REGION)
(TRANSMITTING REGION)
ON PINHOLE (SHIELDING REGION)  PINHOLE APERTURE  (SHIELDING REGION)
(TRANSMITTING REGION)
ON REFLECTING TYPE PINHOLE

SUPER-RESOLUTION OPTICAL HEAD USING OPTICAL SEPARATOR

BACKGROUND OF THE INVENTION

1. Field of the Invention

The present invention relates to an optical head device, and more particularly to an optical head which uses an optical separator and which is used in an optical recording/reproducing device for reproducing data on a recording medium, or for recording/reproducing or recording/reproducing/erasing data onto the recording medium.

2. Description of the Related Art

In the field of optical recording, device such as an optical disk in which a data in a co-axial circular or spiral track formed on the disk is optically reproduced is already in practical and commercial use.

In recent years, with a demand for increasing the memory capacity, there are increasing necessities for a higher recording density and for a reduction in a size of a spot formed on the recording medium. The size of a spot is determined by the wavelength of the laser light source and the numerical aperture (NA) in the objective lens, but the methods for attaining a shorter wavelength in a semiconductor laser and for increasing the numerical aperture NA have reached their limits. Thus, in recent years, research has been in progress on a super-resolution technique for attaining a spot diameter smaller than that of the diffraction limit determined by the wavelength of the laser light source and NA of the objective lens. Prior art examples in which such a super-resolution technique is applied have been disclosed, for example, in Japanese Patent Application Kokai Publication No. Hei 1-315040 and in Japanese Patent Application Kokai Publication No. Hei 1-315041.

In the above disclosed examples, because the super-resolution sidelobe incident on the recording medium causes deterioration of reproduction signals, it is proposed for the optical head device to employ a slit, a pinhole, etc. at the reimaging position in the detection optics for attaining a good reproduction signal (Japanese Patent Application Kokai Publication Hei 2-12623 and Japanese Patent Application Kokai Publication Hei 2-12624). Also, in order to attain a good reproduction signal, it is proposed that the optical head device detect a main beam component and a sidelobe component independently from each other and that the sidelobe component be electrically removed from the main beam component (Japanese Patent Application Kokai Publication Hei 2-206035 and Japanese Patent Application Kokai Publication Hei 2-206036).

The shape of the spot produced in an optical head device employing the super-resolution technique (hereinafter referred to as "super-resolution optical head device") is explained with reference to FIGS. 1A–1C.

For the above super-resolution optical head device, the basic optical system configurations of the first prior art example disclosed in Japanese Patent Application Kokai Publication No. Hei 2-12624 and the second prior art example disclosed in Japanese Patent Application Kokai Publication No. Hei 2-206036 are now explained with reference to FIGS. 2A and 2B, and FIGS. 3A and 3B. Each of these examples of the super-resolution optical head devices shown in FIGS. 2A & 2B and 3A & 3B is an example in which the super-resolution effect is attained only in one direction of the spot illuminated on the recording medium (hereinafter referred to as "one-dimensional super-resolution"), but this can be applied to an example in which the super resolution effect is attained in two directions of the converged spot (hereinafter referred to as "two-dimensional super-resolution").

FIGS. 1A and 1B show results obtained by simulation of the spot profile by the two-dimensional super-resolution. FIG. 1A shows a spot profile formed on the recording medium, and FIG. 1B shows a shape and a component distribution of the spot formed on a pinhole (reimaging position).

Where the wavelength of the laser light source is set to 680 nm, the radiation angles to 8°×21°, the focal length of the objective lens to 4.1 mm, the NA to 0.55, the focal length of the collimating lens to 25.0 mm and the radius of the two-dimensional light shielding region to 1.4 mm, a spot size of 0.89×0.81 µm ($1/e^2$) can be obtained on the recording medium, thereby yielding a spot diameter reducing effect of about 80% with respect to 1.10×1.01 µm of the spot diameter ($1/e^2$) on a diffraction limit.

The spot on the recording medium in the above state is, as shown in FIG. 1A, constituted by the main beam 37 and the sidelobe 38 so that, when the data on the recording medium is reproduced by the main beam 37, the sidelobe 38 unavoidably reproduces other data positioned in front and rear, and right and left of the data, with the sidelobe 38 resulting as noise in the main beam 37.

Also, the distribution of components when the spot is reimaged on the pinhole is shown in FIG. 1B, in which the total component 39 on the pinhole which is the sum of the main beam 37 and the sidelobe 38 on the recording medium resembles the spot profile on the recording medium. When the size of the pinhole aperture is set to be approximately the same as that of the reimaged spot, a shielded light component 40b in the sidelobe component 40 cannot be transmitted through the pinhole aperture and is removed optically from reproduction signals. When the sidelobe component 40 is considered with this being separated into a transmitted light component 40a which is transmitted through the pinhole aperture and a shielded light component 40b which is shielded thereby, it is appreciated that almost all of the sidelobe component 40 becomes the shielded light component 40b so that the reproduction signals are efficiently improved by the insertion of the pinhole.

FIG. 2A shows an optical system configuration of the super-resolution optical head device of the first prior art example explained above.

In FIG. 2A, laser beams emitted from a laser light source 1 are made into parallel light beams by a collimating lens 2, and are then transmitted through a super-resolution modulator 50, a polarizing beamsplitter 4 and a quarter-wave plate 5, after which they are converged by an objective lens 6 so that a micro spot is formed on a recording medium 7. Data signal light beams reflected from the recording medium 7 are transmitted through the objective lens 6 and the quarter-wave plate 5, which are then reflected totally by the polarizing beamsplitter 4, and then are incident on a beamsplitter 8.

The data signal light incident on the beamsplitter 8 is divided into two beams. One beam of light is transmitted through the beamsplitter 8 and, after being converged by a condenser lens (reconverging lens) 12, is transmitted through a slit 51 placed at a reimaging position and is received by a photodetector 14. The other beam of light is reflected by the beamsplitter 8, and is converged by a condenser lens (reconverging lens) 9, and after astigmatism is generated by a cylindrical lens 10, is received by a photodetector 11.

When a light shielding plate, for example, is used as the super-resolution modulator 50, a light shielding region 52 is formed on a center portion of light beams 53 as shown in a shape 50a of the light shielding plate so that a main beam whose spot diameter is smaller than that of a diffraction limit and a sidelobe are formed on the recording medium 7.

As a method to remove the sidelobe component from the data signal light, a slit 51 having at its central portion a light transmitting region 54 and at its peripheral portion a light shielding region 55 as shown in a slit shape 51a is used at the reimaging position so that the sidelobe formed at the reimaging position is removed optically.

A shape of a light receiving portion in the photodetector 14 is shown in FIG. 2B. One light receiving portion 58 exists in the shape 56 of a light receiving portion and receives only the main beam transmitted through the slit 51 as a main beam spot 57.

FIG. 3A shows an optical system configuration of the super-resolution optical head device of the second prior art example explained above.

In FIG. 3A an optical arrangement from a laser light source 1 to an objective lens 6 is the same as that in the first prior art example so that explanation on the arrangement will be omitted.

Data signal light beams reflected from a recording medium 7 are transmitted through an objective lens 6 and a quarter-wave plate 5, and are totally reflected by a polarizing beamsplitter 4, and then are incident on a beamsplitter 8. The data signal light beams that were incident on the beamsplitter 8 are divided into two beams. One beam of light is transmitted through the beamsplitter 8, and is converged by a condenser lens 12, and then is received by a photodetector 14 placed at a reimaging position. The other beam of light is reflected by the beamsplitter 8, and is converged by a condenser lens 9, and after astigmatism is generated by a cylindrical lens 10, is received by a photodetector 11.

A portion for receiving light of differing shapes in the photodetector 14 is shown in FIG. 3B. Three light receiving portions exist in the shape 59 of the light receiving point. A main beam light receiving portion 61a receives a main beam spot 60a and sidelobe light receiving portions 61b receive sidelobe beam spots 60b.

In order to remove the sidelobe component more precisely than in the first prior art example, a signal of the main beam light receiving portion 61a and a signal of the sidelobe light receiving portions 61b in the photodetector 14 placed at the reimaging position are transmitted through amplifiers whose gains are different from each other and are canceled out so that mixture of the sidelobe component 40 into the center portion as shown in FIG. 1B is removed electrically.

The super-resolution optical head device employs, as a focusing method of light beams converged on the recording medium 7 by the objective lens 6 in FIG. 2A and FIG. 3A, a conventional astigmatism method in which astigmatism is generated in the light beams reflected from the recording medium 7 by means of a cylindrical lens 10 and the change in the intensity of the light incident on the photodetector 11 is detected, thereby detecting a focusing error signal.

As a method to cause the converged beams on the recording medium 7 to follow a predetermined track, a conventional push-pull method is employed in which the change in the intensity of the light at a far field in the photodetector 11 receiving light beams reflected from the recording medium 7 is detected so that a tracking error signal is detected.

The first prior art example of the super-resolution optical head device has a shortcoming in that, as shown in FIGS. 1A–1C, the sidelobe 38 formed on the recording medium becomes a sidelobe component 40 at the reimaging position, and the shielded light component 40b in the sidelobe component 40 is removed by the pinhole or the slit having at its center portion a light transmitting region, but the transmitted light component 40a therein is transmitted therethrough and received by the photodetector so that reproduction signal deterioration caused by the transmitted light component 40a cannot be prevented.

In the second prior art example of the super-resolution optical head device, where the focal length of the objective lens is set to 4.1 mm and the focal length of the condenser lens (converging lens) to 30 mm, the magnification of the optical system becomes as large as 7.3, and where a spot diameter on the recording medium is set to 0.8 μm and the distance to a sidelobe is set to 0.9 μm, the size of the main beam light receiving position becomes about 6 μm, and the distance between the center of the main beam light receiving portion and that of the sidelobe light receiving portion becomes about 7 μm. With the current technology, it is impossible to get a photodetector having this size of the light receiving portion. In addition, there is a defect in that the main beam light receiving portion is as close as about 1–2 μm to the sidelobe light receiving portion so that beams illuminating the light receiving portion and the peripheral portion thereof go around to the light receiving portion so that sufficient response of the light receiving portion cannot be attained.

SUMMARY OF THE INVENTION

An object of the invention, therefore, is to overcome the problems existing in the prior art and to provide a practical super-resolution optical head device in which the sidelobe component mixed into data signals is removed so that it is possible to easily obtain reproduction signals with little deterioration.

According to the present invention, in order to solve the problem mentioned above, a super-resolution optical head device comprises an optical system which reimages a super-resolution spot at a reimaging position of laser light beams reflected from a recording medium, and comprises a separating means placed at the reimaging position which means makes optical separation between a main beam component and a sidelobe component by using a method of reflection, diffraction, refraction etc. so that the main beam component and the sidelobe component are detected independently from each other, which results in structure enabling easily obtainable reproduction signals with little deterioration.

According to the present invention, the separating means which makes optical separation between a main beam component and a sidelobe component is placed at the reimaging position so that it is possible to detect the main beam component and the sidelobe component independently from each other.

There exists a small amount of the sidelobe component which is mixed into the optically separated main beam component. The mixture of the sidelobe component is removed electrically by means of the sidelobe component detected independently so that the problem of deterioration in reproduction signals caused by the sidelobe component is solved.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Preferred embodiments according to the present invention will now be explained in detail with reference to FIG. 4 through FIG. 8.

Figure 1A:
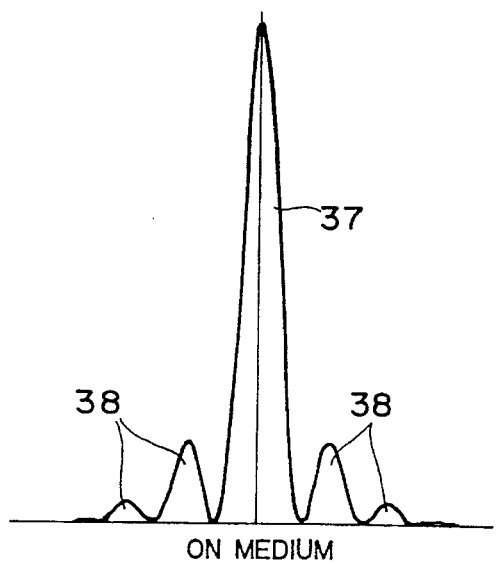
FIGS. 1A–1C shows a result obtained by simulation on the spot profile by the super-resolution optical head device.
Figure 1B:
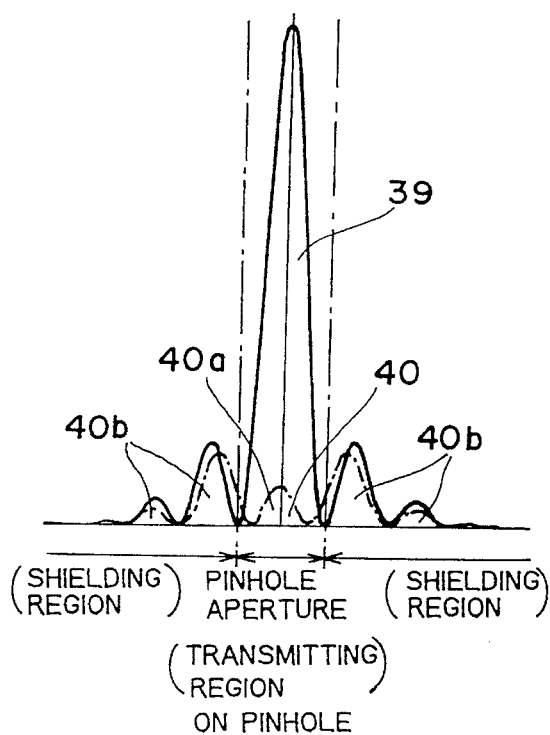
Figure 1C:
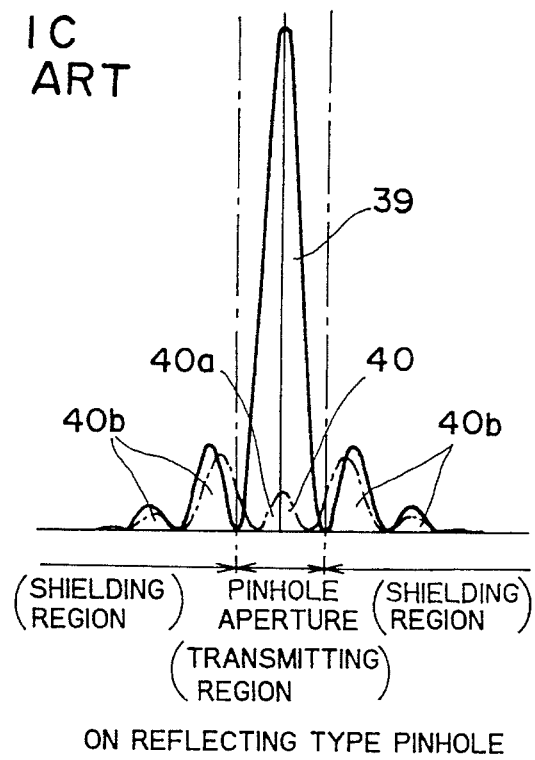
Figure 2A:
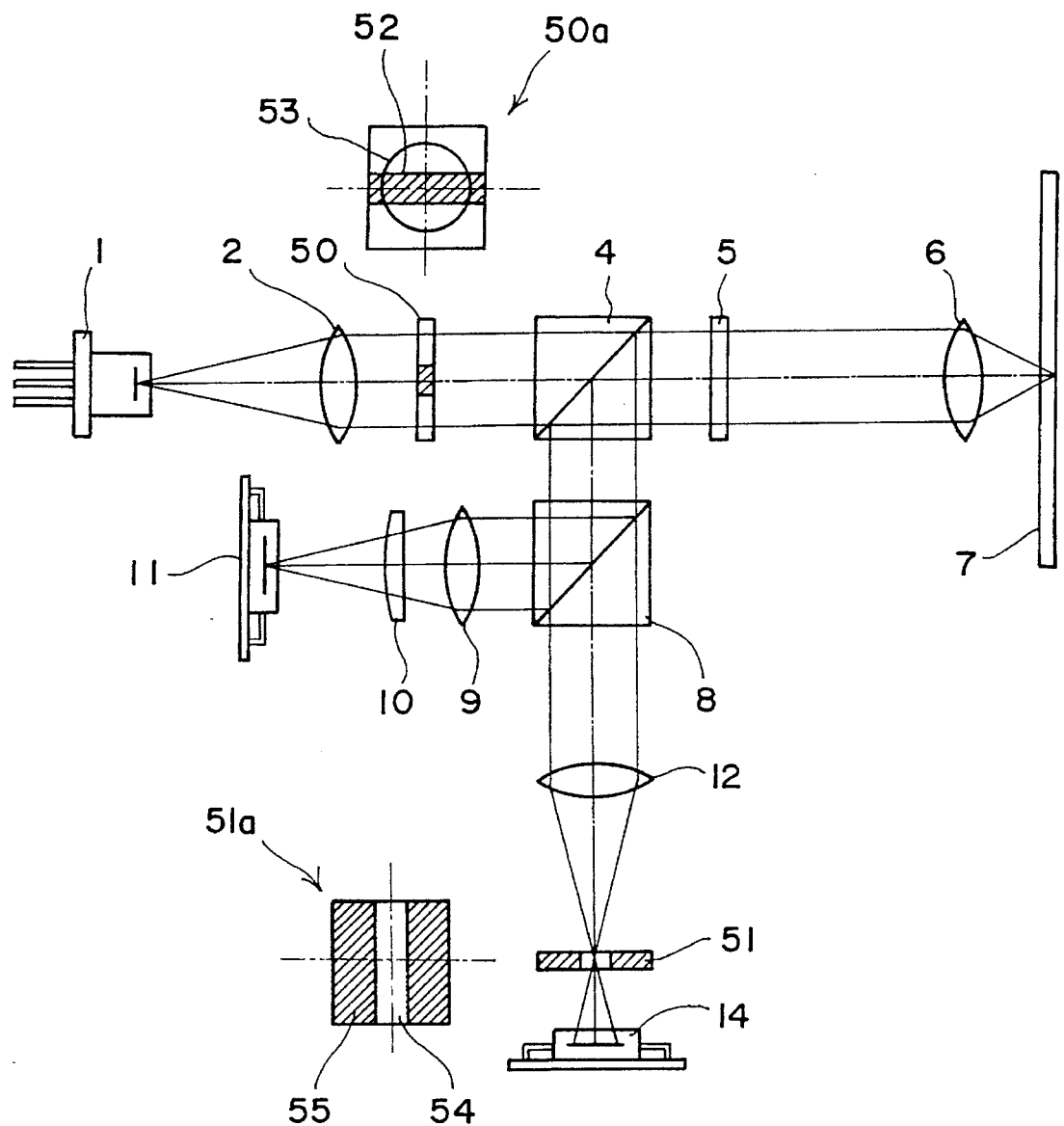
FIGS. 2A and 2B show an optical system configuration of the super-resolution optical head device of a prior art example.
Figure 2B:
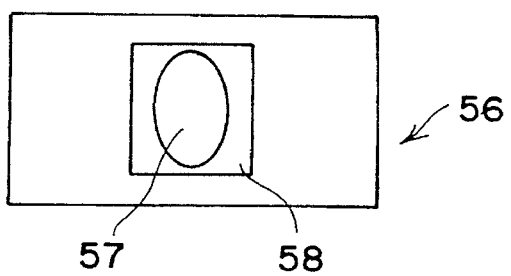
Figure 3A:
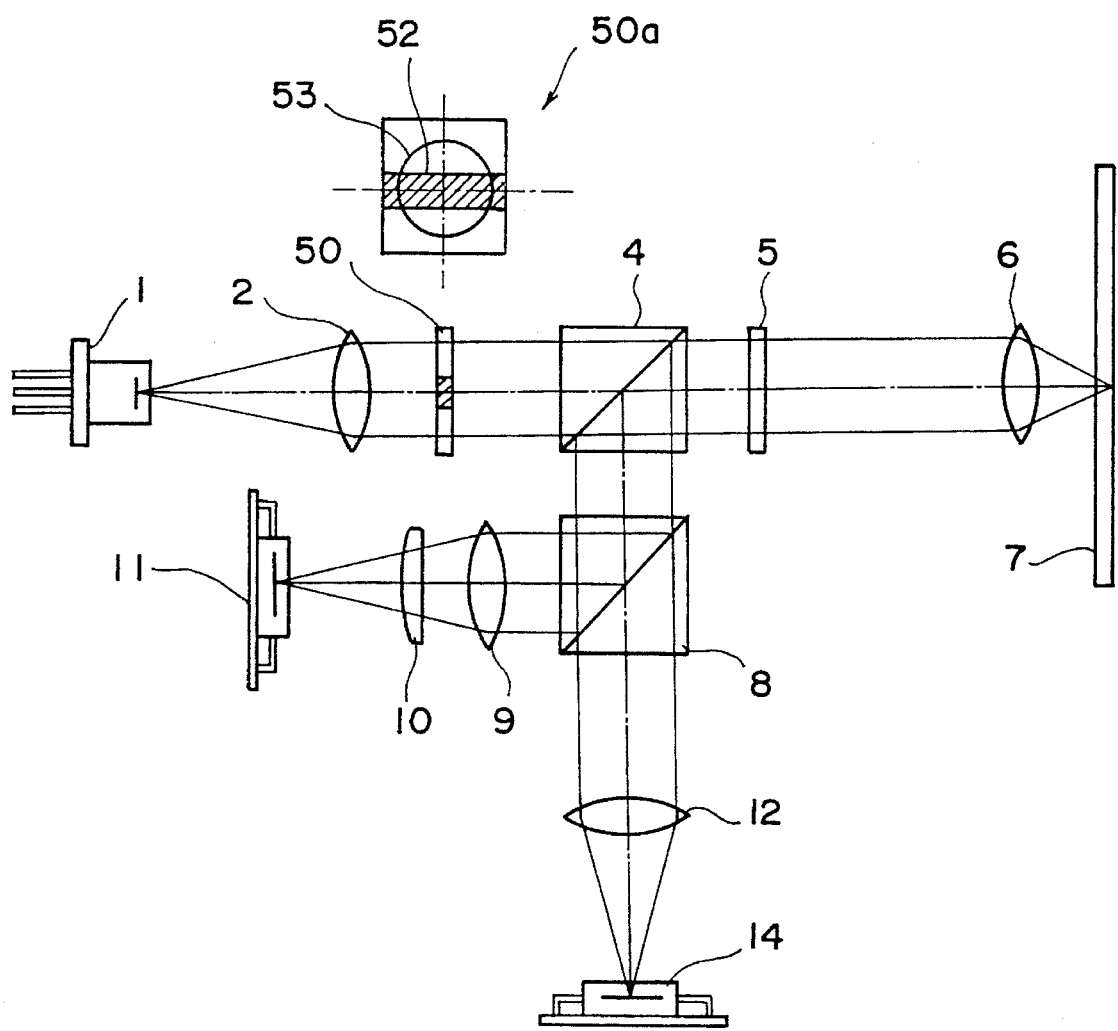
FIGS. 3A and 3B show an optical system configuration of the super-resolution optical head device of another prior art example.
Figure 3B:
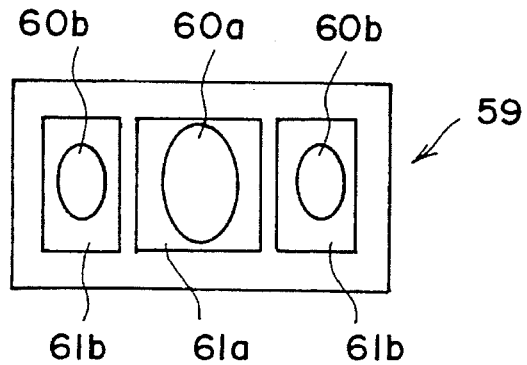
Figure 4:
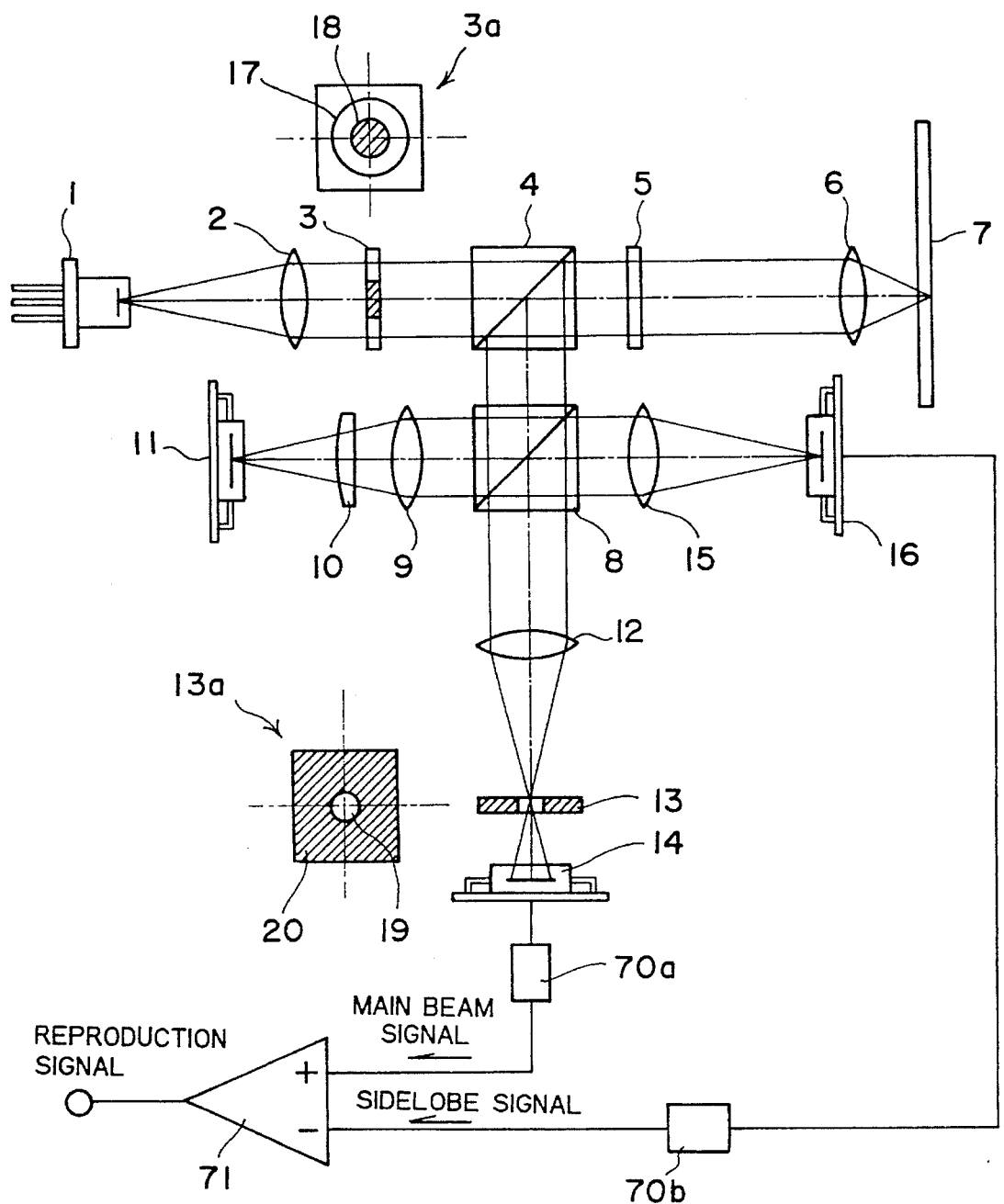
FIG. 4 shows an optical system configuration of a preferred embodiment in super-resolution optical head devices according to the present invention.
Figure 5A:
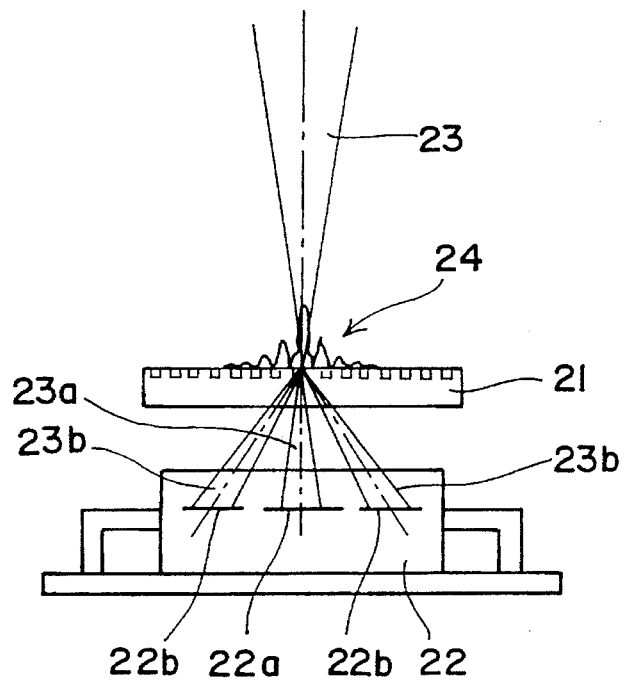
FIGS. 5A and 5B show configurations of separating means in other embodiments according to the present invention each of which means produces optical separation between a main beam and a sidelobe.
Figure 5B:
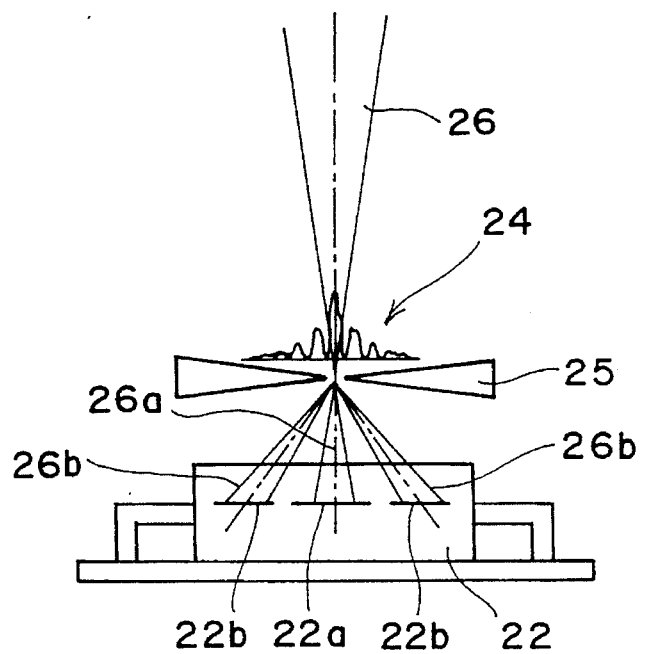
Figure 6A:
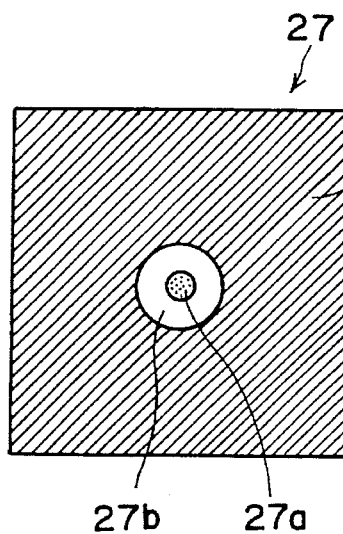
FIGS. 6A and 6B show configurations of separating means in other embodiments according to the present invention each of which means produces optical separation between a part of a sidelobe.
Figure 6B:
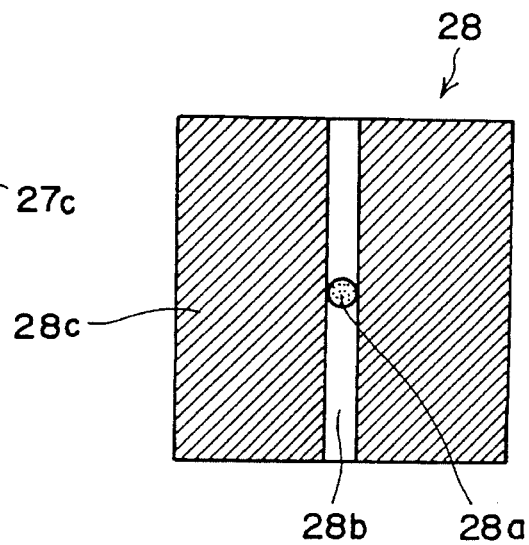
Figure 8:
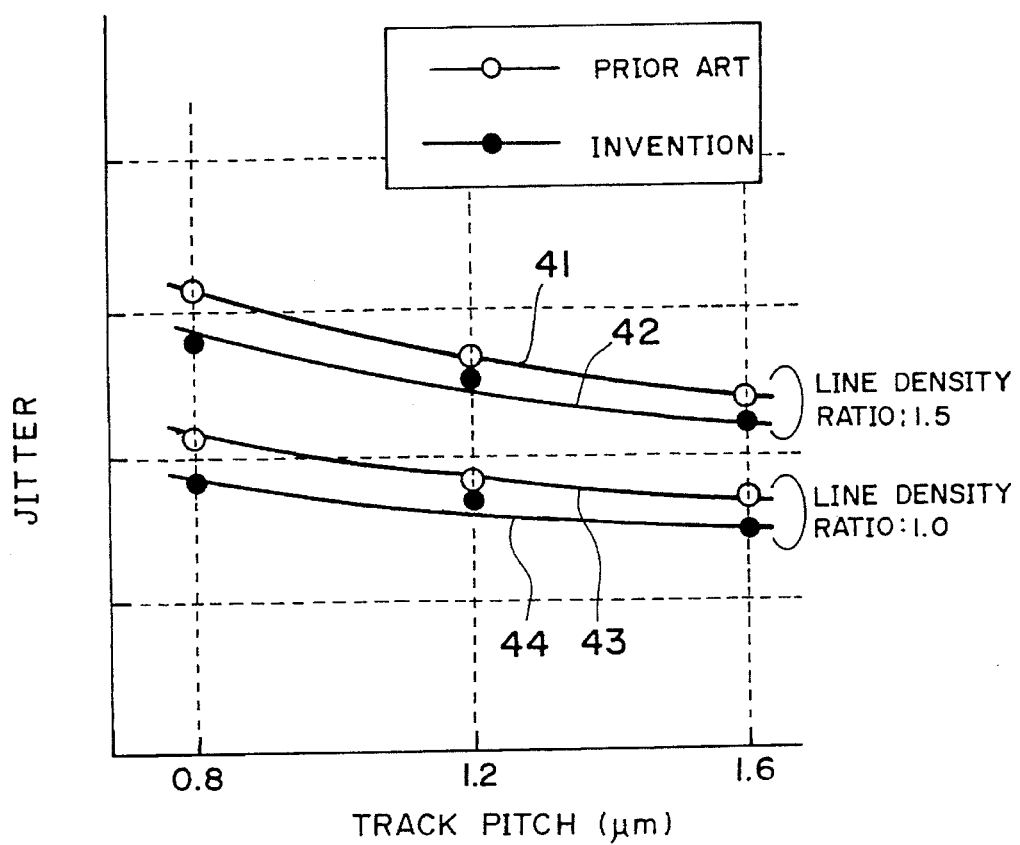
FIG. 8 is a graph of a measurement result showing reproduction signal jitters of the super-resolution optical head device according to the present invention and the conventional device.
Figure 7:
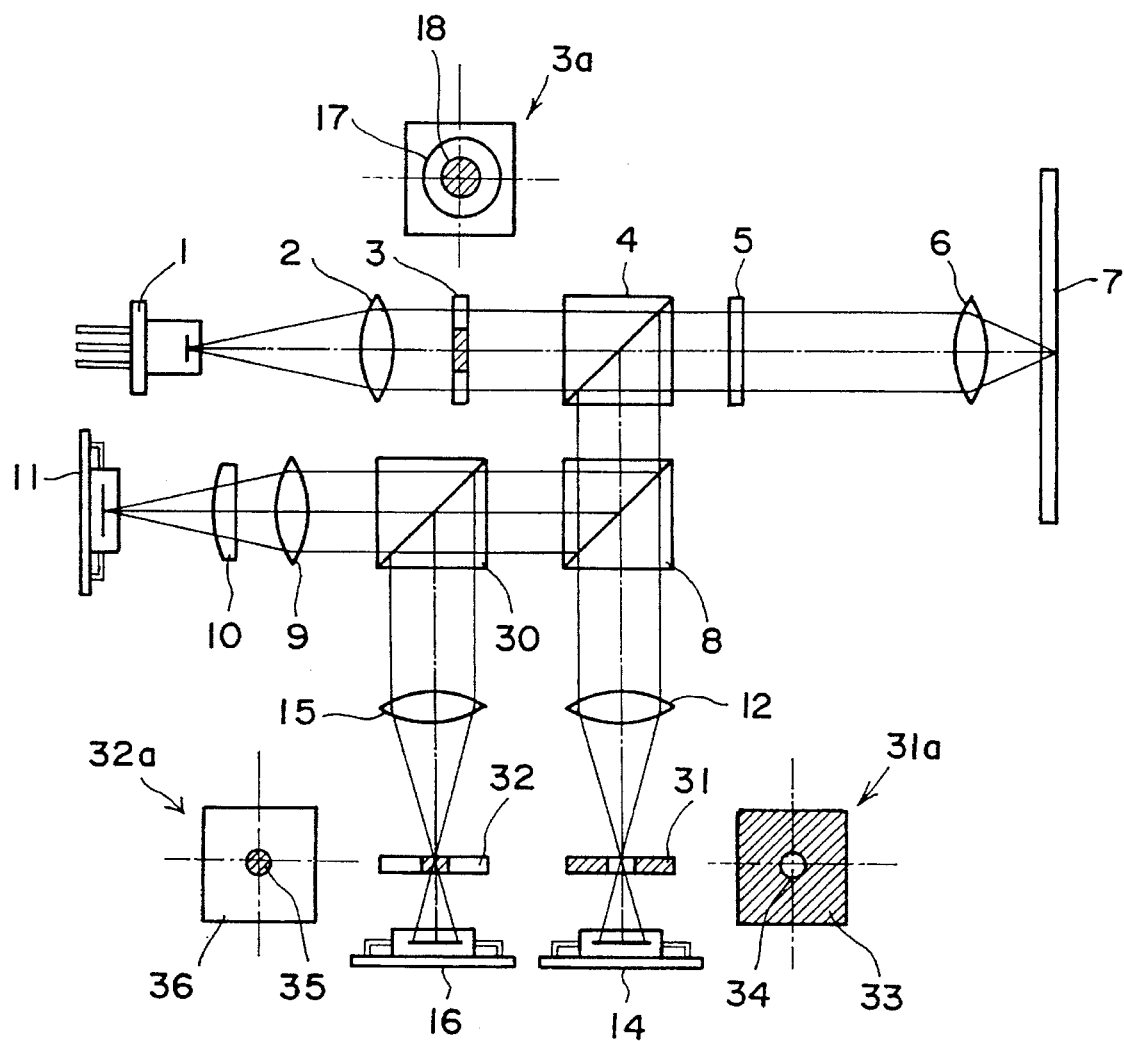
FIG. 7 shows an optical system configuration of another embodiment in a super-resolution optical head devices according to the present invention.

FIG. 4 and FIG. 7 show optical system configurations of the preferred embodiments in super-resolution optical head devices according to the present invention. FIGS. 5A and 5B show configurations of separating means in other embodiments according to the present invention each of which produces optical separation between a main beam and a sidelobe. FIGS. 6A and 6B show configurations of separating means in other embodiments according to the present invention each of which produces optical separation between a part of a sidelobe. FIGS. 1A–1C show results obtained by simulation on the spot profile by the super-resolution optical head device. FIG. 1A shows a spot profile formed on a recording medium, FIG. 1B shows a spot profile and its light distribution formed on a pinhole (a reimaging position), and FIG. 1C shows a shape and its light distribution formed on a reflection-type pinhole (a reimaging position). FIG. 8 is a graph of a measurement result showing reproduction signal jitters of the super-resolution optical head device according to the present invention and the conventional device.

The first embodiment of an optical system in a super-resolution optical head device according to the present invention will be explained with reference to FIG. 4 and FIGS. 1A–1C.

Laser beams emitted from a laser light source 1 are made into parallel light beams by a collimating lens 2, and are transmitted through a super-resolution modulator 3, a polarizing beamsplitter 4 and a quarter-wave plate 5, and then are converged by an objective lens 6 so that a micro spot is formed on a recording medium 7. Data signal light beams reflected from the recording medium 7 are transmitted through the objective lens 6 and the quarter-wave plate 5, and are totally reflected by the polarizing beamsplitter 4, and then are incident on a beamsplitter 8.

The data signal light beams incident on the beamsplitter 8 are divided into two beams. One beam of light is reflected by the beamsplitter 8, and is converged by a condenser lens (reconverging lens) 9, and after astigmatism is generated by a cylindrical lens 10, is received by a photodetector 11.

The other beam of light is transmitted through the beamsplitter 8, and after being converged by a condenser lens (reconverging lens) 12, is reimaged on a reflection-type pinhole 13 which is placed at a reimaging position and produces separation between a main beam and a sidelobe. The main beam is transmitted through the reflection-type pinhole 13 and is received by a photodetector 14. The sidelobe is reflected by the reflection-type pinhole 13, and is transmitted through the condenser lens 12. And the transmitted light is reflected by the beamsplitter 8, and is converged by a condenser lens 15, and then is received by a photodetector 16.

When a two-dimensional light shielding plate, for example, is used as the super-resolution modulator 3, a light shielding region 18 is formed on center portion of light beams 17 as shown in a shape 3a of the light shielding plate so that a main beam 37 whose spot diameter is smaller than that of a diffraction limit and a sidelobe 38 are formed on the recording medium 7 as shown in FIG. 1A.

The reflection-type pinhole 13 comprises a light transmitting region 19 and a light reflecting region 20 as shown in a shape 13a of the reflection-type pinhole. When an outer diameter of the light transmitting region (the pinhole aperture) 19 is set to be approximately the same as the diameter of the reimaged spot as shown in FIG. 1C, a shielded light component 40b in a sidelobe component 40 cannot be transmitted through the pinhole aperture but is reflected thereby to be separated optically from the main beam transmitted through the reflection-type pinhole 13. Here, the shielded light component 40b in the sidelobe component 40 is reflected and removed, but a transmitted light component 40a therein is transmitted through the pinhole and is received by the photodetector 14 so that this component becomes noise to reproduction signals.

Therefore, the reproduction of data is conducted as follows. From the data signal light totally reflected from the recording medium 7, the main beam signal including the transmitted light component 40a in the sidelobe component 40 which is obtained from the light transmitted through the reflection-type pinhole 13 is received by the photodetector 14, and the reflected light component 40b in the sidelobe component 40 which is obtained from the light reflected by the reflection-type pinhole 13 is received by the photodetector 16. An amplifier 70a connected to the photodetector 14 amplifies the main beam signal and an amplifier 70b connected to the photodetector 16 amplifies the sidelobe signal. Both the amplifier 70a and the amplifier 70b are connected to a differential amplifier 71. And, gains of the amplifiers 70a, 70b are so tuned that both the transmitted light component 40a in the sidelobe component 40 which exists in the main beam signal outputted from the amplifier 70a and the sidelobe signal outputted from the amplifier 70b are canceled out from each other, which makes it possible to electrically remove the transmitted light component 40a in the sidelobe component 40 which exists in the main beam signal and to obtain the reproduction signal having little deterioration.

Next, operation of the super-resolution optical head device according to the present invention will be explained.

The super-resolution optical head device according to the present invention employs, as a focusing method of beams converged on the recording medium 7 by the objective lens 6, a conventional astigmatism method in which astigmatism is generated in the beams reflected from the recording medium 7 by means of a cylindrical lens 10 and the change in the intensity of the light received by the photodetector 11 is detected so that a focusing error signal is detected.

As a method to make the converged beams on the recording medium 7 follow a predetermined track, a conventional push-pull method is employed in which the change in the intensity of the light at a far field in the photodetector 11 receiving beams reflected from the recording medium 7 is detected so that a tracking error signal is detected.

Separating means in other embodiments according to the present invention each of which means makes optical separation between a main beam and a sidelobe will be explained with reference to FIGS. 5A and 5B.

FIG. 5A shows the embodiment employing a diffraction method to make separation between the main beam and the sidelobe. At a reimaging position, there is a diffraction-type pinhole 21 (a pinhole 21 in which the light reflecting region 20 of the reflection-type pinhole 13 shown in FIG. 4 is replaced by a diffraction grating) which comprises a light transmitting region where only the main beam in a reimaged spot profile 24 of a converged beam 23 is transmitted, and a light diffracting region where the sidelobe is completely diffracted (diffraction without the 0th order diffracted light). The main beam is channeled as transmitted light 23a to a main beam light receiving portion 22a of a photodetector 22, the sidelobe is channeled as the +1st and the −1st order diffracted light 23b to a sidelobe light receiving portion 22b thereof.

FIG. 5B shows the embodiment employing a refraction method to produce separation between the main beam and the sidelobe. At a reimaging position, there is a refraction-type pinhole 25 (a pinhole 25 in which the reflection region 20 of the reflection-type pinhole 13 shown in FIG. 4 is replaced by a refraction structure) which comprises a light transmitting region where only the main beam in a reimaged spot profile 24 of a converged beams 26 is transmitted and a light refracting region where the sidelobe is refracted. The main beam is led as transmitted light 23a to a main beam light receiving portion 22a of a photodetector 22, and the sidelobe is led as refracted light 26b to a sidelobe light receiving portion 22b thereof.

In reproduction of data in the arrangements as shown in FIGS. 5A and 5B, a main beam signal obtained by the main beam light receiving portion 22a and a sidelobe signal detected by the sidelobe light receiving portion 22b are transmitted through amplifiers whose gains are different from each other and are canceled out so that the sidelobe component which would exist in the main beam is removed electrically.

FIGS. 6A and 6B show configurations of separating means in other embodiments according to the present invention each of which means optically separates a part of a sidelobe.

FIG. 6A shows a configuration of a reflection-and-absorption type pinhole. The reflection-and-absorption type pinhole 27 comprises a light transmitting region 27a, a light reflecting region 27b and a light absorbing region 27c. Only the sidelobe whose order of light is such that it has a high probability of being mixed into the main beam from the reimaged super-resolution spot is reflected and is channeled to a photodetector for detecting the sidelobe.

FIG. 6B shows a configuration of another reflection-and-absorption type pinhole. This reflection-and-absorption type pinhole 28 comprises a light transmitting region 28a, a light reflecting region 28b and a light absorbing region 28c. Only the intersymbol interference component that has a high probability of being mixed into the main beam from the reimaged super-resolution spot is reflected and is channeled to a photodetector for detecting the sidelobe.

Each of the reflection-and-absorption type pinholes shown in FIGS. 6A and 6B has a large effect on the electrical removal of sidelobe component because only the portion of the light which is likely to be mixed into the main beam component is separated spatially.

As another embodiment of a pinhole for making separation between a main beam and a sidelobe, there is a pinhole which has a distribution of reflection factor on a light incident surface and has a light absorbing layer on the back surface, whereby the electrical removal can be made based on the degree of the effect on the sidelobe components.

Another embodiment of an optical system in a super-resolution optical head device according to the present invention will be explained with reference to FIG. 7.

Because the optical arrangement from a laser light source 1 to an objective lens 6 is the same as that shown in FIG. 4, only the portion different from that in the optical system shown in FIG. 1 will be explained.

Data signal light beams reflected from a recording medium 7 are divided in two directions and, moreover, are divided in two directions by a beamsplitter 30. The light beams transmitted through the beamsplitter 8 are converged by a condenser lens (reconverging lens) 12, and are divided into a main beam and a sidelobe by means of a pinhole 31 placed at a reimaging position. Only the main beam is transmitted through the pinhole 31 and is received by a photodetector 14. The light beams reflected by the beamsplitter 30 are converged by a condenser lens (reconverging lens) 15, and are divided into a main beam and a sidelobe by means of a reversed-type pinhole 32 placed at a reimaging position. Only the sidelobe is transmitted through the reversed-type pinhole 32 and is received by a photodetector 16. The pinhole 31 comprises a light transmitting region 34 and a light shielding region 33 as shown in a pinhole shape 31a so that only the main beam can be transmitted through the light transmitting region 34. The reversed-type pinhole 32 comprises a light shielding region 35 and a light transmitting region 36 as shown in a pinhole shape 32a so that only the sidelobe can be transmitted through the light transmitting region 36.

In reproduction of data, a main beam signal by the photodetector 14 and a sidelobe signal detected independently by the photodetector 16 are transmitted through amplifiers whose gains are different from each other, and are canceled out so that the sidelobe component which would exist in the main beam is removed electrically.

This embodiment has an effect that it is possible to conduct the electrical removal depending on the degree of effects on the sidelobe component when a shape and a transmission factor of the reversed-type pinhole 32 are selected suitably.

FIG. 8 is a graph in which the super-resolution optical head device according to the present invention is compared with the conventional device (the device in the first prior art example: the device using only a pinhole), both of which devices employ the same super-resolution modulator (a two-dimensional light shielding plate). The graph gives a measurement result showing jitters of reproduction signals reproduced with CLV (Constant Linear Velocity) from measurement disks in which, with the same line density as that of CD (Compact Disc), i.e., the line density ratio to CD is 1.0, the track pitch varies from 0.8 μm to 1.6 μm at units of 0.2 μm and another measurement disk in which, with the line density ratio of 1.5 to CD, the track pitch also varies from 0.8 μm to 1.6 μm at units of 0.2 μm.

The jitter values resulted from the measurement by means of the system according to the present invention (the system provided by the present invention) are represented by the line 42 when the line density ratio is 1.0 to CD and are represented by the line 44 when the line density ratio is 1.5 to CD. Compared with the line 41 and the line 43 which are resulted from the measurement by means of the conventional device, the present invention has a reducing effect of about 20% in the jitter values.

The kind of the super-resolution modulator shown in the embodiments does not matter. For example, a modulator which modulates a laser light partially, a phase modulator and so on can be employed in the present invention.

The example of infinite optics using collimating lenses is described in each of the above-mentioned embodiments. But, finite optics without a collimating lens can be also employed in the present invention.

The device according to the present invention can be applied to any super-resolution optical head devices which are used for a read-only type medium, a write-once type medium and a rewrite-type medium.

In the above-mentioned embodiments, the focusing error signal detection method and tracking error signal detection method are employed. But, other conventional methods can be adapted to the present invention.

As is explained above, in the super-resolution optical head device according to the present invention, the separating means which makes optical separation between a main beam component and sidelobe component is placed at the reimaging position. The main beam component and the sidelobe component are detected independently from each other, and the sidelobe component mixed into the main beam component is electrically removed therefrom. As a result, the device according to the present invention has the effect that it is possible to obtain the reproduction signals having little deterioration caused by the sidelobe component.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A super-resolution optical head device in which a first super-resolution spot having a diameter smaller than that of a diffraction limit is formed on a recording medium by partially modulating at least one of a phase and an intensity of laser beams emitted from a laser light source, said super-resolution optical head device comprising:

an optical system by which laser beams reflected from said recording medium are converged and a second super-resolution spot is reimaged;

a separating means for optically separating said second super-resolution spot into a main beam component and a sidelobe component; and a plurality of optical detectors, wherein said separating means independently lead said main beam component and said sidelobe component to respective optical detectors.

2. A super-resolution optical head device according to claim 1, in which said separating means has a reflection-type pinhole comprising:

a light transmitting region through which said main beam component of said second super-resolution spot is transmitted; and a light reflecting region by which said sidelobe component at said second super-resolution spot is reflected.

3. A super-resolution optical head device according to claim 1, in which said separating means has a diffraction-type pinhole comprising:

a light transmitting region through which said main beam component of said second super-resolution spot is transmitted; and a light diffracting region by which said sidelobe component at said second super-resolution spot is diffracted.

4. A super-resolution optical head device according to claim 1, in which said separating means has a refracting-type pinhole comprising:

a light transmitting region through which said main beam component of said second super-resolution spot is transmitted; and a light diffracting region by which said sidelobe component of said second super-resolution spot is refracted.

5. A super-resolution optical head device according to claim 1, in which said separating means has a reflection-and-absorption type pinhole comprising:

a light transmitting region through which said main beam component of said second super-resolution spot is transmitted;

a light reflecting region by which a predetermined order of said sidelobe component of said second super-resolution spot having a high probability of being mixed into said main beam component is reflected; and a light absorbing region by which orders of said sidelobe component other than said predetermined order are absorbed.

6. A super-resolution optical head device according to claim 1, in which said separating means has a reflection-and-absorption type pinhole comprising:

a light transmitting region through which said main beam component of said second super-resolution spot is transmitted;

a light reflecting region by which a predetermined intersymbol interference component of said sidelobe component of said second super-resolution spot having a high probability of being mixed into said main beam component is reflected; and a light absorbing region by which intersymbol interference components of said sidelobe component other than said predetermined intersymbol interference component are absorbed.

7. A super-resolution optical head device according to claim 1, in which said separating means has a pinhole comprising:

a light transmitting region through which said main beam component of said second super-resolution spot is transmitted and has a reversed-type pinhole with a light transmitting region through which said sidelobe component of said second super-resolution spot is transmitted.

* * * * *